(12) United States Patent
Kim et al.

(10) Patent No.: US 9,846,262 B2
(45) Date of Patent: Dec. 19, 2017

(54) INSPECTION APPARATUS FOR THERMO-HYGROMETER BASED ON PHASE CHANGE AND METHODS FOR CONTROLLING AND INSPECTING THE SAME

(71) Applicant: KOREA RESEARCH INSTITUTE OF STANDARDS AND SCIENCE, Daejeon (KR)

(72) Inventors: Yong-Gyoo Kim, Daejeon (KR); Byung Il Choi, Daejeon (KR); Sang Bong Woo, Daejeon (KR); Jong Cheol Kim, Daejeon (KR); Sang Wook Lee, Chungcheongnam-do (KR)

(73) Assignee: Korea Research Institute of Standards and Science (KR)

(*) Notice: Subject to any disclaimer, the term of this patent is extended or adjusted under 35 U.S.C. 154(b) by 39 days.

(21) Appl. No.: 15/023,397

(22) PCT Filed: Oct. 20, 2014

(86) PCT No.: PCT/KR2014/009841
§ 371 (c)(1),
(2) Date: Mar. 20, 2016

(87) PCT Pub. No.: WO2015/076502
PCT Pub. Date: May 28, 2015

(65) Prior Publication Data
US 2016/0209547 A1    Jul. 21, 2016

(30) Foreign Application Priority Data
Nov. 20, 2013  (KR) .......................... 10-2013-0141494

(51) Int. Cl.
*G01W 1/18*   (2006.01)
*G01K 15/00*   (2006.01)
*G01W 1/02*   (2006.01)

(52) U.S. Cl.
CPC .............. *G01W 1/18* (2013.01); *G01K 15/007* (2013.01); *G01W 1/02* (2013.01)

(58) Field of Classification Search
CPC .......... G01N 1/06; G01N 1/286; G01N 25/64; G01N 25/56; G01N 25/66; G02B 21/32;
(Continued)

(56) References Cited

U.S. PATENT DOCUMENTS 3,079,087 A * 2/1963 Herrick .................... F24D 3/00
                                                        122/32
3,661,724 A * 5/1972 Strickler ................ G01N 25/56
                                                        204/277
(Continued)

FOREIGN PATENT DOCUMENTS

JP      2002-245689 A     8/2002

OTHER PUBLICATIONS

International Search Report issued in connection with PCT/KR2014/009841.

*Primary Examiner* — Harshad R Patel
*Assistant Examiner* — Brandi Hopkins
(74) *Attorney, Agent, or Firm* — Akerman LLP

(57) ABSTRACT

Disclosed therein are an inspection apparatus for a thermo-hygrometer based on phase change and methods for controlling and inspecting the same which can simultaneously inspect a thermometer and a hygrometer through a simple method using a phase change of reactants. The thermo-hygrometer based on phase change includes: reactants of at least two kinds; a plurality of cylinder type cells; a reactor body having a temperature sensor hole and a plurality of cell
(Continued)

holes; a flow pipe in which a first gas circulates by a circulation pump; a relative humidity chamber which has a relative humidity sensor disposed therein; and a temperature control unit which is mounted below the reactor body, wherein when a phase change of a first reactant is induced, the relative humidity sensor is inspected based on the relative humidity of the first gas, and the temperature sensor is inspected based on the phase change temperature of the first reactant.

15 Claims, 5 Drawing Sheets

(58) Field of Classification Search
CPC ..... H01J 2237/2001; H01J 2237/31745; H01J 2237/208; B01F 5/0603; H01M 8/04291; H01M 8/04126; H01M 8/04164; H01M 2008/1095; G01K 1/18; G01K 15/007; B01B 1/06; H01L 21/67109; G01W 1/18; G01W 1/02
USPC ... 73/37, 863.12, 1.01, 29.02, 865.6, 863.11, 73/863.01; 250/440.11; 374/28, 179, 374/208, 180, 141
See application file for complete search history.

(56) References Cited

U.S. PATENT DOCUMENTS

| | | | | |
|---|---|---|---|---|
| 4,221,058 | A * | 9/1980 | Zagorzycki | F26B 21/08 34/557 |
| 4,580,354 | A * | 4/1986 | Lindberg | F26B 21/08 34/475 |
| 5,343,747 | A * | 9/1994 | Rosen | G01N 25/56 165/223 |
| 7,677,794 | B2 | 3/2010 | Kim et al. | |
| 7,729,035 | B2 | 6/2010 | Kim | |
| 7,845,245 | B2 | 12/2010 | Hayles et al. | |
| 8,661,919 | B2 * | 3/2014 | Oba | B01B 1/06 261/129 |
| 2003/0188638 | A1 * | 10/2003 | Zhang | B01F 5/0603 96/294 |
| 2010/0040106 | A1 * | 2/2010 | Sakami | G01N 25/64 374/28 |
| 2015/0068283 | A1 * | 3/2015 | Yamauchi | G01N 25/66 73/29.02 |

* cited by examiner

[Fig. 1]
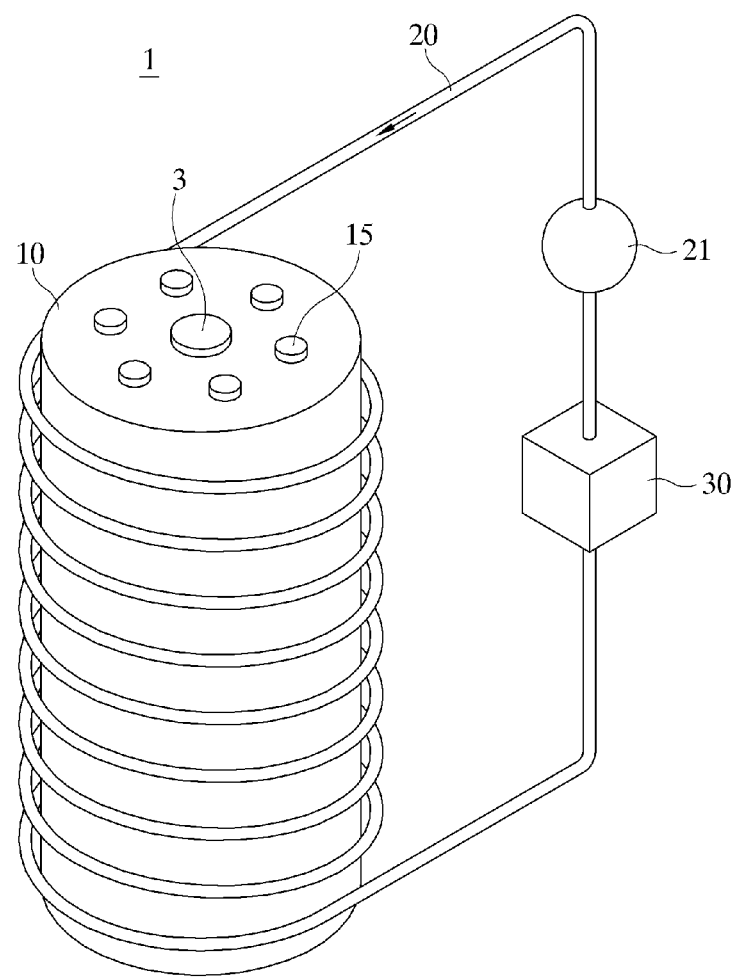

[Fig. 2]
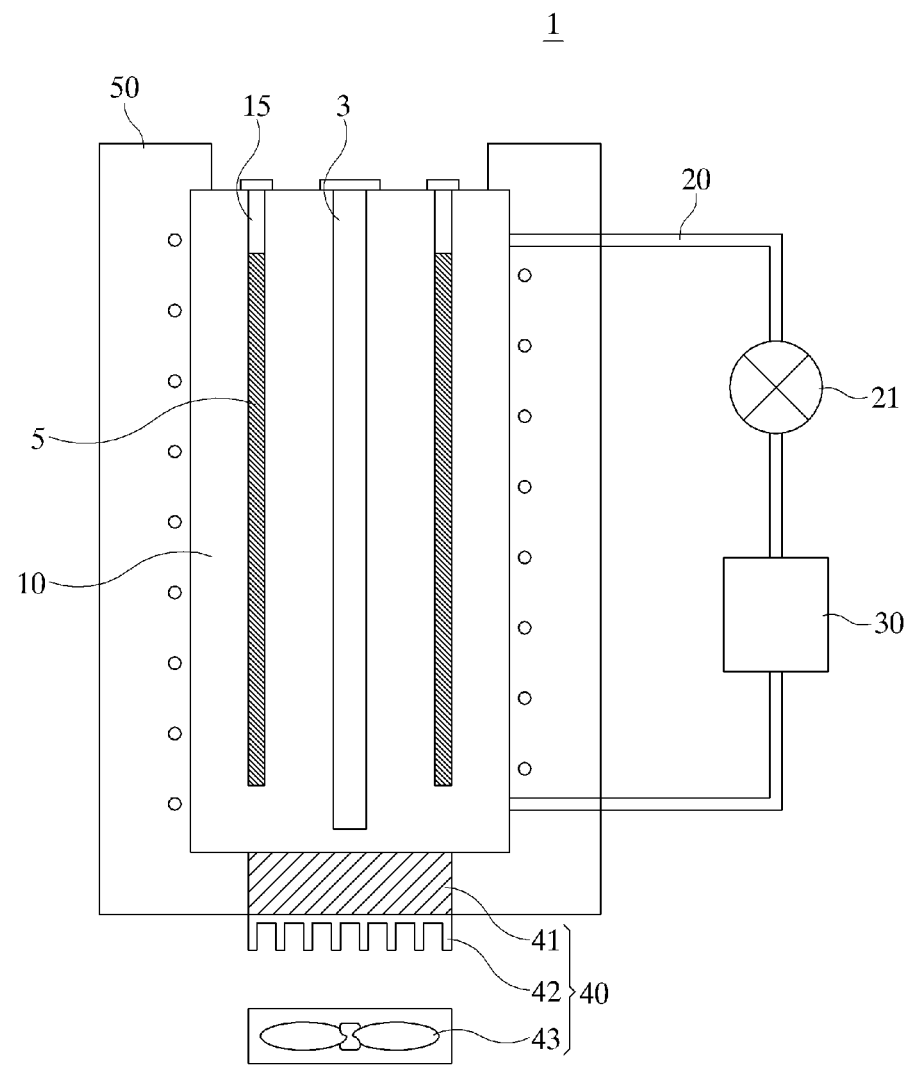

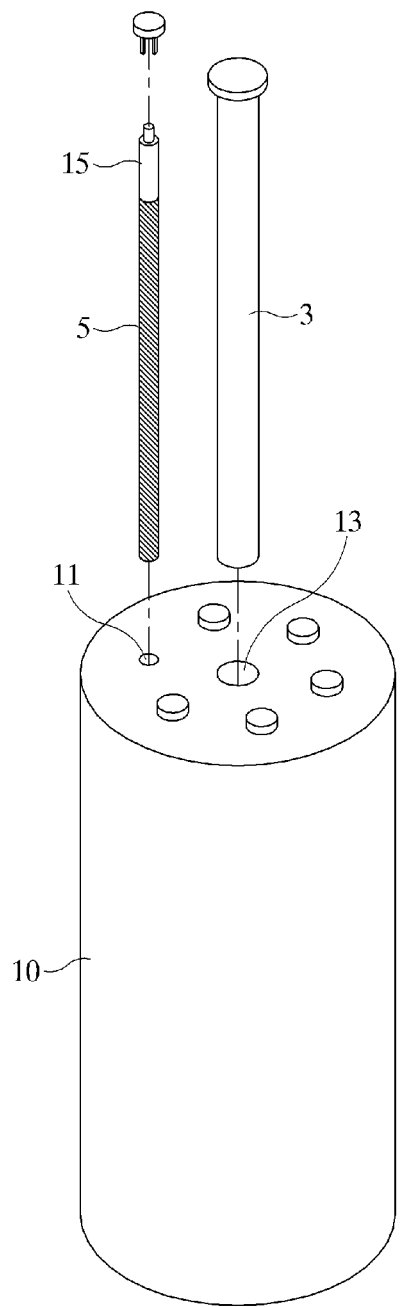
[Fig. 3]

[Fig. 4]
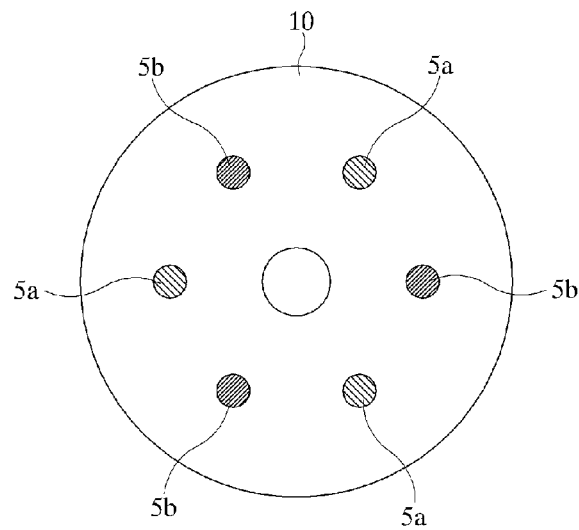
[Fig. 5]
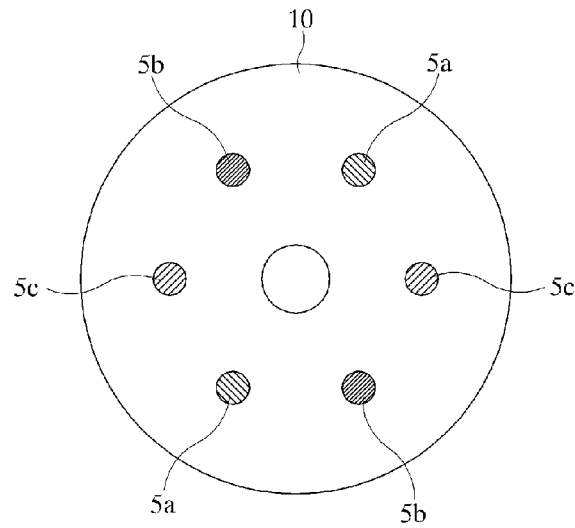
[Fig. 6]
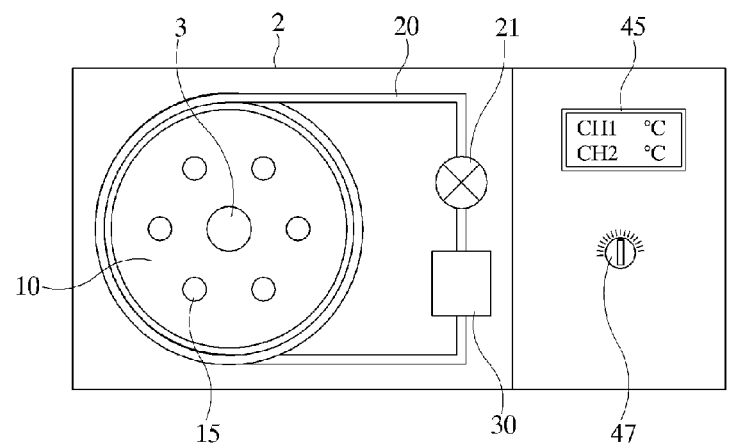

[Fig. 7]
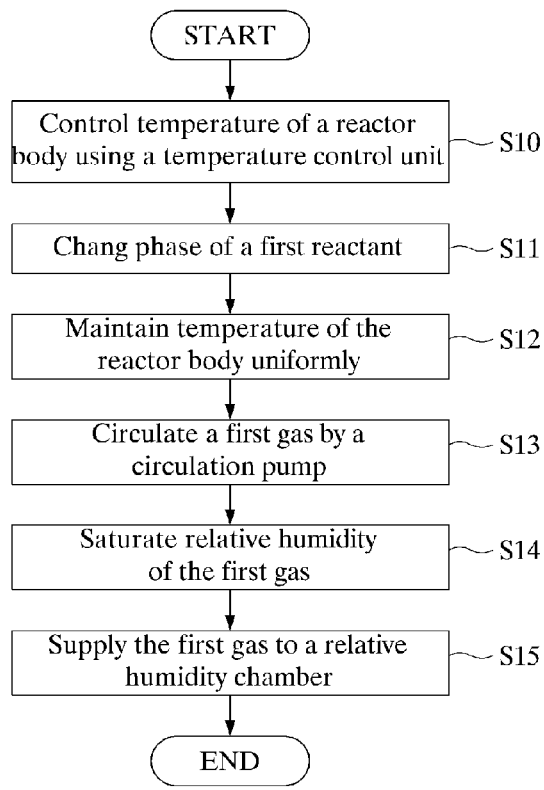
[Fig. 8]
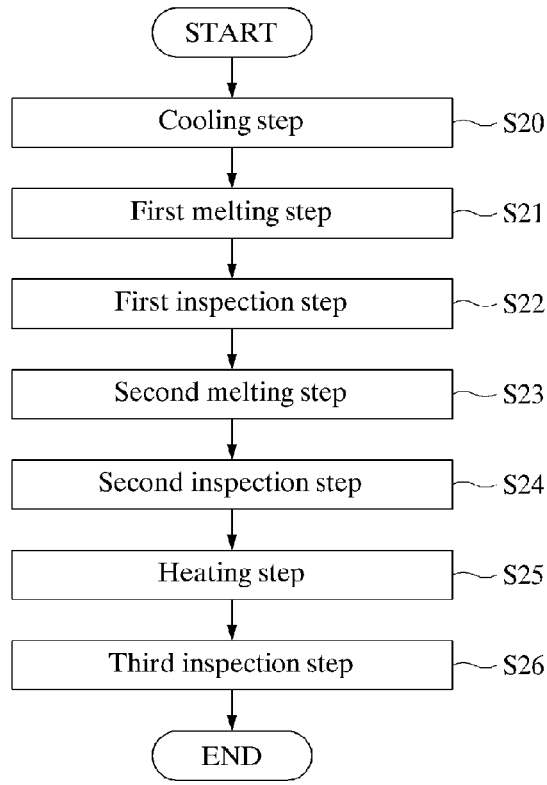

INSPECTION APPARATUS FOR THERMO-HYGROMETER BASED ON PHASE CHANGE AND METHODS FOR CONTROLLING AND INSPECTING THE SAME

This application is a national phase of PCT/KR2014/009841, filed Oct. 20, 2014, and claims priority to KR 10-2013-0141494, filed Nov. 20, 2013, the entire contents of both of which are hereby incorporated by reference.

TECHNICAL FIELD

The present invention relates to an inspection apparatus for a thermo-hygrometer based on phase change, and more particularly, to an inspection apparatus for a thermo-hygrometer based on phase change and methods for controlling and inspecting the same which can simultaneously inspect a thermometer and a hygrometer through a simple method using a phase change of reactants.

BACKGROUND ART

In an automatic weather station (AWS) which has been widely used for accurate and rapid weather forecast, a temperature sensor and a humidity sensor are very delicate devices which play a key role for weather observation, and must be periodically inspected to carry out a more precision observation. In order to inspect the temperature sensor and the humidity sensor, a temperature generator and a humidity generator which are precise are needed.

Conventionally, in order to inspect the temperature sensor and the humidity sensor, the temperature generator and the humidity generator must be additionally provided, and the temperature sensor and the humidity sensor are individually inspected using the temperature generator and the humidity generator, and hence, such a method is ineffective in an aspect of time and in an economic aspect and is inconvenient in carrying out inspection.

Moreover, the humidity generator is operated by a method of mixing and using dry air and saturated air, but has several disadvantages in that it is inaccurate to control to a desired relative humidity, and in that it is bulky and expensive because it needs a reference humidity measuring system, and hence, it is limited in utilization.

Therefore, development of an apparatus for inspecting a thermo-hygrometer which can easily and conveniently inspect the temperature sensor and the humidity sensor using an inexpensive and small-sized apparatus for generating temperature and humidity is required.

DISCLOSURE OF INVENTION

Technical Problem

Accordingly, the present invention has been made in an effort to solve the above-mentioned problems occurring in the prior arts, and it is an object of the present invention to provide an inspection apparatus for a thermo-hygrometer based on phase change and methods for controlling and inspecting the same which can simultaneously inspect a thermometer and a hygrometer through a simple method using a phase change of reactants.

In detail, it is an object of the present invention to provide an inspection apparatus for a thermo-hygrometer based on phase change, and which can generate a desired temperature and relative humidity using a phase change of reactants of at least two kinds which are different in phase change temperature from each other, thereby simultaneously inspecting a temperature sensor and a humidity sensor.

Moreover, it is another object of the present invention to provide an inspection apparatus for a thermo-hygrometer based on phase change which is formed to insert reactants into a reactor body in the form of a round magazine of a pistol so as to easily replace reactants and effectively inspect the temperature sensor and the humidity sensor.

Furthermore, it is a further object of the present invention to provide an inspection apparatus for a thermo-hygrometer based on phase change which can generate correct temperature and relative humidity, is easy to be carried because it can be manufactured in a small size without needing a reference humidity measuring system, and can be manufactured at low costs.

In the meantime, technical objects to be achieved by the present invention are not restricted to the above-mentioned technical objects, and other objects of the present invention which are not mentioned above will be apparent from the following detailed description of the preferred embodiments of the invention in conjunction with the accompanying drawings.

Solution to Problem

To achieve the above objects, the present invention provides an inspection apparatus for a thermo-hygrometer based on phase change comprising: reactants of at least two kinds which are different in phase change temperature from each other; a plurality of cylinder type cells each of which has a hollow inside containing the reactant of one kind out of the reactants; a reactor body having a temperature sensor hole which is formed in the middle part thereof to a predetermined depth and to which a temperature sensor is inserted, and a plurality of cell holes which are circumferentially formed around the temperature sensor hole to a predetermined depth in a direction parallel with the temperature sensor hole and to which the cylinder type cells are respectively inserted; a flow pipe which has a first part formed to surround the outer circumferential surface of the reactor body and in which a first gas circulates by a circulation pump; a relative humidity chamber which has a relative humidity sensor disposed therein and which is connected with the flow pipe to receive the first gas; and a temperature control unit which is mounted below the reactor body, wherein when the temperature control unit controls temperature of the reactor body to induce a phase change of the first reactant which is at least one kind of the reactants, the reactor body maintains a predetermined temperature range by latent heat generated by the phase change of the first reactant, relative humidity of the first gas circulated by the circulation pump becomes in a saturated state by temperature of the reactor body while the first gas circulates the first part, the saturated first gas is supplied to the relative humidity chamber, the relative humidity sensor measures relative humidity of the first gas supplied to the relative humidity chamber, the relative humidity sensor is inspected based on the measured relative humidity of the first gas, and the temperature sensor is inspected based on the phase change temperature of the first reactant.

Advantageous Effects of Invention

The present invention has been made in an effort to solve the above-mentioned problems occurring in the prior arts, and can provide an inspection apparatus for a thermo-hygrometer based on phase change and methods for controlling and inspecting the same which can simultaneously inspect a thermometer and a hygrometer through a simple method using a phase change of reactants.

In detail, the present invention can provide an inspection apparatus for a thermo-hygrometer based on phase change which can generate a desired temperature and relative humidity using the phase change of reactants of at least two kinds which are different in phase change temperature from each other, thereby simultaneously inspecting a temperature sensor and a humidity sensor.

Moreover, the present invention can provide an inspection apparatus for a thermo-hygrometer based on phase change which is formed to insert reactants into a reactor body in the form of a round magazine of a pistol so as to easily replace reactants and effectively inspect the temperature sensor and the humidity sensor.

Furthermore, the present invention can provide an inspection apparatus for a thermo-hygrometer based on phase change which can generate correct temperature and relative humidity, is easy to be carried because it can be manufactured in a small size without needing a reference humidity measuring system, and can be manufactured at low costs.

In the meantime, effects which can be obtained by the present invention are not restricted to the above-mentioned effects, and other effects of the present invention which are not mentioned above will be apparent from the following detailed description of the preferred embodiments of the invention in conjunction with the accompanying drawings.

BRIEF DESCRIPTION OF DRAWINGS

The following drawings attached to this specification of the present invention just illustrate a preferred embodiment of the present invention and serve to make those skilled in the art understand the technical idea of the present invention further, and hence, the present invention shall not be limited to the matters illustrated and described in the drawings.

FIG. 1 is a perspective view of an inspection apparatus for a thermo-hygrometer based on phase change according to a preferred embodiment of the present invention.

FIG. 2 is a sectional view of the inspection apparatus for the thermo-hygrometer based on phase change according to the preferred embodiment of the present invention.

FIG. 3 is a view showing a structure of a reactor body which can be applied to the inspection apparatus for the thermo-hygrometer based on phase change.

FIGS. 4 and 5 are schematic diagrams showing an example of arrangement of reactants which are applicable to the present invention.

FIG. 6 is a view showing a structure of the inspection apparatus for the thermo-hygrometer based on phase change which can be applied to the present invention.

FIG. 7 is a flow chart related with an example of an operation of the inspection apparatus for the thermo-hygrometer based on phase change.

FIG. 8 is a flow chart related with an example of a method for inspecting a temperature sensor and a relative humidity sensor using the inspection apparatus for the thermo-hygrometer based on phase change.

BEST MODE FOR CARRYING OUT THE INVENTION

The inspection apparatus 1 for the thermo-hygrometer based on phase change to be applicable to the present invention includes a cylinder type cell 15, a reactor body 10, a flow pipe 20, a circulation pump 21, a relative humidity chamber 30, and a temperature control unit 40.

The reactor body 10 may be formed in a cylindrical shape, may be manufactured of copper or aluminum which is high in thermal conductivity.

A temperature sensor hole 13 is formed at the middle part of the upper face of the reactor body 10 to a sufficient depth that the temperature sensor can be inserted therein, and a plurality of cell holes 11 are formed around the temperature sensor hole 13 to a depth that cylinder type cells 15 can be inserted. The cell holes 11 are formed in the circumference around the temperature sensor hole 13 like the form of a round magazine of a pistol, and are spaced apart from the temperature sensor hole 13 at a predetermined interval. Additionally, the cell holes 11 may be formed to be spaced apart from each other at regular intervals.

The temperature sensor 3 to be inspected by the present invention is inserted into the temperature sensor hole 13 of the reactor body 10, and the temperature sensor 3 may be detached from the temperature sensor hole 13 of the reactor body 10. Moreover, the cylinder type cells 15 are respectively inserted into the cell holes 11 of the reactor body 10, and may be detached from the cell holes 11 of the reactor body 10, such that reactants 5 contained in the cylinder type cells 15 may be easily replaced.

Each of the cylinder type cells 15 is formed hollow, and the reactants 5 are contained in the cylinder type cells 15. The reactants 5 which are necessary for the present invention are at least two kinds which are different in phase change temperature from each other. Furthermore, it is preferable that the reactants 5 be materials which can cause a phase change between a liquid and a solid below room temperature because the reactants 5 have a freezing point below room temperature.

Air or gases, such as argon (Ar) or nitrogen (N2) may flow inside the flow pipe 20. Such a flow of the gases is achieved by operation of the circulation pump 21 mounted in the flow pipe 20. A part of the flow pipe 20 is formed to surround the outer circumferential surface of the reactor body 10. It is preferable that the flow pipe 20 surround the outer circumferential surface of the reactor body 10 in a spiral form to make heat exchange smooth by increasing a contact area between the reactor body 10 and the flow pipe 20.

The flow pipe 20 is connected with the relative humidity chamber 30, and hence, some of gases flowing by operation of the circulation pump 21 may be supplied into the relative humidity chamber 30. A relative humidity sensor to be inspected by the present invention is disposed inside the relative humidity chamber 30, such that the relative humidity sensor can be inspected using the gases supplied into the relative humidity chamber 30.

The temperature control unit 40 may be mounted below the reactor body 10, and includes a Peltier module 41, a heat radiation fin 42 and a fan 43. The Peltier module 41 generates or absorbs heat to cool or heat the reactor body 10, and the heat radiation fin 42 emits heat generated in the Peltier module 41 to the outside. The fan 43 serves to cool excessive heat when excessive heat is generated by the Peltier module 41.

An insulation material 50 is formed to cover the outside of the reactor body 10 in order to prevent influences by external temperature, for instance, heat is emitted to the outside or outside heat is absorbed.

MODE FOR THE INVENTION

Reference will be now made in detail to the preferred embodiment of the present invention with reference to the attached drawings. Moreover, an embodiment described in the following does not unduly limit the contents of the present invention described in claims, and it should be understood that the entire structure described in the following embodiment is not essential as a method of solution of the present invention.

Conventionally, in order to inspect a temperature sensor and a humidity sensor, a temperature generator and a humidity generator must be additionally provided, but it is disadvantageous in aspects of costs and efficiency and is complicated in inspection process and is not easy to be operated. Furthermore, because a reference humidity measuring system for inspecting the humidity sensor is needed to inspect the humidity sensor, it has a disadvantage in that it is bulky and is difficult to be carried.

The present invention is to propose an inspection apparatus for thermo-hygrometer which is small-sized and effective and is convenient in operation because it can simultaneously inspect the temperature sensor and the humidity sensor using a phase change.

<Structure of Thermo-Hygrometer Inspection Apparatus>

Hereinafter, referring to FIGS. 1 to 5, a structure of the inspection apparatus for a thermo-hygrometer based on phase change to be proposed by the present invention will be described in detail.

FIG. 1 is a perspective view of an inspection apparatus for a thermo-hygrometer based on phase change according to a preferred embodiment of the present invention, FIG. 2 is a sectional view of the inspection apparatus for the thermo-hygrometer based on phase change according to the preferred embodiment of the present invention, and FIG. 3 is a view showing a structure of a reactor body which can be applied to the inspection apparatus for the thermo-hygrometer based on phase change.

Referring to FIGS. 1 to 3, the inspection apparatus 1 for the thermo-hygrometer based on phase change to be applicable to the present invention includes a cylinder type cell 15, a reactor body 10, a flow pipe 20, a circulation pump 21, a relative humidity chamber 30, and a temperature control unit 40. The components illustrated in FIGS. 1 to 3 are not essential, and the inspection apparatus 1 for the thermo-hygrometer based on phase change may have a smaller number of the components or a larger number of the components.

As shown in FIGS. 1 to 3, the reactor body 10 may be formed in a cylindrical shape, may be manufactured of copper or aluminum which is high in thermal conductivity, and may be a mesh type aluminum block which has lots of pores. A thermal fluid which has high thermal conductivity is inserted into the reactor body to make heat transfer smooth.

A temperature sensor hole 13 is formed at the middle part of the upper face of the reactor body 10 to a sufficient depth that the temperature sensor can be inserted therein, and a plurality of cell holes 11 are formed around the temperature sensor hole 13 to a depth that cylinder type cells 15 can be inserted. The cell holes 11 are formed in the circumference around the temperature sensor hole 13 like the form of a round magazine of a pistol, and are spaced apart from the temperature sensor hole 13 at a predetermined interval. Additionally, the cell holes 11 may be formed to be spaced apart from each other at regular intervals.

The temperature sensor 3 to be inspected by the present invention is inserted into the temperature sensor hole 13 of the reactor body 10, and the temperature sensor 3 may be detached from the temperature sensor hole 13 of the reactor body 10. Moreover, the cylinder type cells 15 are respectively inserted into the cell holes 11 of the reactor body 10, and may be detached from the cell holes 11 of the reactor body 10, such that reactants 5 contained in the cylinder type cells 15 may be easily replaced.

Each of the cylinder type cells 15 is formed hollow, and the reactants 5 are contained in the cylinder type cells 15. The reactants 5 which are necessary for the present invention are at least two kinds which are different in phase change temperature from each other. Furthermore, it is preferable that the reactants 5 be materials which can cause a phase change between a liquid and a solid below room temperature because the reactants 5 have a freezing point below room temperature. As an example, such reactants 5 may be ethylene glycol with the melting point of about −13° C., acetonyl acetone with the melting point of about −6° C. or 3,5-dimethylaniline with the melting point of about 9.8° C. If such reactants 5 are used, relative humidity of less than 100% at room temperature of about 25° C. can be reproduced.

As shown in FIG. 3, the cylinder type cells 15 are formed in a long bar shape in the longitudinal direction and can be opened and closed by a lid or a stopper, and can seal the reactants 5 contained inside the cylinder type cells 15.

Air or gases, such as argon (Ar) or nitrogen (N2) may flow inside the flow pipe 20. Such a flow of the gases is achieved by operation of the circulation pump 21 mounted in the flow pipe 20. A part of the flow pipe 20 is formed to surround the outer circumferential surface of the reactor body 10. It is preferable that the flow pipe 20 surround the outer circumferential surface of the reactor body 10 in a spiral form to make heat exchange smooth by increasing a contact area between the reactor body 10 and the flow pipe 20.

The flow pipe 20 is connected with the relative humidity chamber 30, and hence, some of gases flowing by operation of the circulation pump 21 may be supplied into the relative humidity chamber 30. A relative humidity sensor to be inspected by the present invention is disposed inside the relative humidity chamber 30, such that the relative humidity sensor can be inspected using the gases supplied into the relative humidity chamber 30.

As shown in FIG. 2, the temperature control unit 40 may be mounted below the reactor body 10, and includes a Peltier module 41, a heat radiation fin 42 and a fan 43. The Peltier module 41 generates or absorbs heat to cool or heat the reactor body 10, and the heat radiation fin 42 emits heat generated in the Peltier module 41 to the outside. The fan 43 serves to cool excessive heat when excessive heat is generated by the Peltier module 41.

An insulation material 50 is formed to cover the outside of the reactor body 10 in order to prevent influences by external temperature, for instance, heat is emitted to the outside or outside heat is absorbed.

In the meantime, referring to FIGS. 4 and 5, a preferred embodiment of a method for arranging kinds of the reactants contained in the cylinder type cell will be described. FIGS. 4 and 5 are schematic diagrams showing an example of arrangement of reactants which are applicable to the present invention.

It is preferable that six cell holes 11 be formed in the reactor body 10. If the number of the cell holes 11 is increased, a separation distance between the cell holes 11 becomes shortened, and it may have an influence on temperature change. The six cell holes 11 are respectively inserted into the six cylinder type cells 15.

As shown in FIG. 4, the two kinds of the reactants 5a and 5b which are different in phase change temperature from each other are contained in the cylinder type cells 15. In order to reduce a temperature influence due to the phase change, the reactants of the same kind are not arranged to adjoin. That is, the six cylinder type cells 15 are respectively inserted into the cell holes 11 in such a manner that one reactant 5a is located next to another reactant 5b of the different kind. The phase temperature change at two points can be inspected using the arrangement of the reactants as shown in FIG. 4.

As shown in FIG. 5, the reactants 5a, 5b and 5c of three kinds which are different in phase change temperature may be contained inside the six cylinder type cells 15. In the same way, in order to reduce the temperature influence due to the phase change, the reactants 5a, 5b and 5c are not arranged in such a way that the reactants of the same kind adjoin. That is, the six cylinder type cells 15 are respectively inserted into the cell holes 11 in such a manner that one reactant 5a is located next to the reactants 5b or 5c of the different kind and the reactants of the same kind are located in the diagonal direction. The phase temperature change at three points can be inspected using the arrangement of the reactants as shown in FIG. 5.

<Operation of Thermo-Hygrometer Inspection Apparatus>

Hereinafter, referring to FIGS. 6 and 7, an operation of the inspection apparatus for the thermo-hygrometer based on phase change to be proposed by the present invention will be described in detail. FIG. 6 is a view showing a structure of the inspection apparatus for the thermo-hygrometer based on phase change which can be applied to the present invention, and FIG. 7 is a flow chart related with an example of an operation of the inspection apparatus for the thermo-hygrometer based on phase change.

As shown in FIG. 6, a dual temperature indicator 45 and a temperature control switch 47 are formed on a housing 2 which surrounds the outside of the inspection apparatus 1 for the thermo-hygrometer based on phase change according to the preferred embodiment of the present invention.

The dual temperature indicator 45 is connected with the reactor body 10 and the relative humidity chamber 30, and indicates temperature of the reactor body 10 at a channel 1 and indicates temperature of the relative humidity chamber 30 at a channel 2. The temperature control switch 47 is connected with the temperature control unit 40 which is mounted below the reactor body 10 and controls the Peltier module 41 to generate or absorb heat in order to control temperature of the reactor body 10.

Referring to FIG. 7, the operation process of the inspection apparatus 1 for the thermo-hygrometer based on phase change will be described. First, a user can control temperature of the reactor body 10 by properly regulating the temperature control switch 47 (S10).

Continuously, because the reactants 5 contained inside the cylinder type cells 15 are different in phase change temperature from each other, when temperature of the reactor body 10 is changed, it induces a phase change of the reactant of one kind out of the reactants 5 contained inside the cylinder type cells 15 (S11). Latent heat is generated by the phase change of the reactant, and it keeps temperature of the reactor body 10 at a predetermined temperature (S12).

Next, a first gas circulates the flow pipe 20 by the circulation pump 21 (S13). The flow pipe 20 is formed in a spiral form to surround the reactor body 10 so as to make heat exchange between the reactor body 10 and the flow pipe 20 smooth. The first gas is increased in relative humidity by temperature of the reactor body 10 while flowing in the flow pipe 20 in the spiral form. When the circulation of the first gas by the circulation pump 21 is repeated, relative humidity of the first gas becomes in a saturated state (S14).

Continuously, the saturated first gas is supplied to the relative humidity chamber 30 in which the relative humidity sensor is mounted, and the first gas is continuously circulated by the circulation pump 21 till the relative humidity of the first gas supplied to the relative humidity chamber 30 is stabilized because temperature of the relative humidity chamber 30 is different from temperature of the reactor body 10 (S15). Through the above process, the relative humidity sensor measures relative humidity of the first gas supplied to the relative humidity chamber 30 in order to inspect whether or not the relative humidity sensor is operated correctly.

<Inspection Method Using Inspection Apparatus 1 for the Thermo-Hygrometer Based on Phase Change>

Hereinafter, referring to FIG. 8, an inspection method using the inspection apparatus for the thermo-hygrometer based on phase change will be described. FIG. 8 is a flow chart related with an example of a method for inspecting the temperature sensor and the relative humidity sensor using the inspection apparatus for the thermo-hygrometer based on phase change.

Here, FIG. 8 is an embodiment to inspect the temperature sensor and the relative humidity sensor using the inspection apparatus in which first and second reactants of two kinds which are different in phase change temperature are accommodated in the cylinder type cells 15. It is assumed that the melting point of the first reactant is a first temperature and the melting point of the second reactant is a second temperature, and the first temperature is lower than the second temperature. Moreover, the six cylinder type cells 15 are respectively inserted into the cell holes 11 of the reactor body 10, and arrangement of the reactants may be formed as shown in FIG. 4.

First, in a cooling step, the user regulates the temperature control switch 47 to control the temperature control unit 40, and the temperature control unit 40 controls temperature of the reactor body 10 to be lower than the first temperature. Therefore, the first reactant and the second reactant inside the cylinder type cells 15 are all coagulated (S20).

Continuously, in a first melting step, the user regulates the temperature control switch 47 to control the temperature control unit 40, and thereby, temperature of the reactor body 10 becomes higher than the first temperature but lower than the second temperature. Therefore, the first reactant is coagulated (S21).

Latent heat is generated according to the melting of the first reactant so as to maintain temperature of the reactor body 10 at the predetermined temperature. The first gas circulating in the flow pipe 20 by the circulation pump 21 is increased in relative humidity by temperature of the reactor body 10 while spirally flowing in a part of the flow pipe 20 which surrounds the outer circumferential surface of the reactor body 10, and the relative humidity of the first gas becomes in a saturated state while circulation of the first gas by the circulation pump 21 is repeated. The saturated first gas is supplied to the relative humidity chamber 30, and the circulation by the circulation pump 21 is continued till the relative humidity of the first gas supplied to the relative humidity chamber 30 is stabilized.

Next, in a first inspection step, the relative humidity sensor disposed inside the relative humidity chamber 30 measures the relative humidity of the supplied first gas, and inspects the relative humidity sensor based on a measured value. Additionally, the temperature sensor is inspected based on the first temperature which is the phase change temperature of the first reactant (S22).

Continuously, in a second melting step, the user regulates the temperature control switch 47 to control the temperature control unit 40, and thereby, temperature of the reactor body 10 is set to be higher than the second temperature. Therefore, the second reactant is melted (S23).

In like manner, latent heat is generated according to the melting of the second reactant so as to maintain temperature of the reactor body 10 at the predetermined temperature. The first gas circulating in the flow pipe 20 by the circulation pump 21 is increased in relative humidity by temperature of the reactor body 10 while spirally flowing in a part of the flow pipe 20 which surrounds the outer circumferential surface of the reactor body 10, and the relative humidity of the first gas becomes in a saturated state while circulation of the first gas by the circulation pump 21 is repeated. The saturated first gas is supplied to the relative humidity chamber 30, and the circulation by the circulation pump 21 is continued till the relative humidity of the first gas supplied to the relative humidity chamber 30 is stabilized.

Next, in a second inspection step, the relative humidity sensor disposed inside the relative humidity chamber 30 measures the relative humidity of the supplied first gas, and inspects the relative humidity sensor based on a measured value. Additionally, the temperature sensor is inspected based on the second temperature which is the phase change temperature of the second reactant. When the first and second reactants are all melted and the second inspection step is finished, inspection of the relative humidity sensor is finished (S24).

Continuously, in a heating step, the user regulates the temperature control switch 47 to control the temperature control unit 40, and thereby, temperature of the reactor body 10 is set to the third temperature which is higher than the second temperature. Here, the third temperature may be in a range of 10° C. to 50° C. (S25).

Next, in a third inspection step, the temperature sensor 3 is inspected based on temperature of the reactor body 10. Accordingly, inspection of the temperature sensor 3 is also finished (S26).

According to the inspection apparatus for the thermo-hygrometer based on phase change, the temperature sensor and the relative humidity sensor can be inspected simultaneously, the phase changing materials can be easily replaced by the structure of the cylinder type cells, the reference humidity measuring system is not needed, and the inspection apparatus for the thermo-hygrometer based on phase change is easy to be carried because it is small-sized, can be manufactured at low costs and is easy in operation.

In the meantime, the inspection apparatus for the thermo-hygrometer based on phase change can be realized as a readable code in a recording medium that a computer can read. The recording medium that the computer can read includes all kinds of recording devices which store data readable by a computer system. For instance, there are ROMs, RAMs, CD-ROMs, magnetic tapes, floppy discs, and optical data storage devices. Alternatively, the recording medium may be realized in the form of a carrier wave, for instance, transfer through the Internet. Moreover, the readable recording medium may store and execute readable cords which are dispersed to computer systems connected through a network and are readable in a spilt-phase form. Additionally, functional programs, cords and cord segments which can realize the present invention can be easily deduced by programmers in this technical field.

While the preferred embodiments of the apparatus and method according to the present invention are shown by way of example in the drawings, it will be understood by those skilled in the art that there is no intent to limit the preferred embodiments of the apparatus and method to the particular forms disclosed and that some or all of the embodiments of the present invention can be selectively combined to achieve various changes of the present invention.

The invention claimed is:

1. An inspection apparatus for a thermo-hygrometer based on phase change comprising:
   reactants of at least two kinds which are different in phase change temperature from each other;
   a plurality of cylinder type cells each having a hollow inside containing the reactant of one kind out of the reactants;
   a reactor body having a temperature sensor hole which is formed in a middle part thereof to a predetermined depth and to which a temperature sensor is inserted, and a plurality of cell holes which are circumferentially formed around the temperature sensor hole to a predetermined depth in a direction parallel with the temperature sensor hole and to which the cylinder type cells are respectively inserted;
   a flow pipe having a first part formed to surround an outer circumferential surface of the reactor body and in which a first gas circulates by a circulation pump;
   a relative humidity chamber having a relative humidity sensor disposed therein and which is connected with the flow pipe to receive the first gas; and
   a temperature control unit mounted below the reactor body,
   wherein when the temperature control unit controls temperature of the reactor body to induce a phase change of a first reactant which is at least one kind of the reactants, the reactor body maintains a predetermined temperature range by latent heat generated by the phase change of the first reactant, a relative humidity of the first gas circulated by the circulation pump becomes in a saturated state by temperature of the reactor body while the first gas circulates the first part to form a saturated first gas, the saturated first gas is supplied to the relative humidity chamber, the relative humidity sensor measures relative humidity of the saturated first gas supplied to the relative humidity chamber, the relative humidity sensor is inspected based on the measured relative humidity of the saturated first gas, and the temperature sensor is inspected based on the phase change temperature of the first reactant.

2. The inspection apparatus for a thermo-hygrometer according to claim 1, wherein the cell holes are circumferentially spaced apart from each other around the temperature sensor hole at a predetermined interval.

3. The inspection apparatus for a thermo-hygrometer according to claim 2, wherein the reactant contained in the cylinder cell which is inserted into a first cell hole which is one selected from the cell holes is different in kind from the reactant contained in the cylinder cell which is inserted into a second cell hole adjacent to the first cell hole.

4. The inspection apparatus for a thermo-hygrometer according to claim 1, wherein each of the cylinder type cells is detachable from the reactor body.

5. The inspection apparatus for a thermo-hygrometer according to claim 1, wherein the first part of the flow pipe is formed to spirally surround the outer circumferential surface of the reactor body.

6. The inspection apparatus for a thermo-hygrometer according to claim 1, further comprising:
   an insulating material which surrounds at least a part of the outer circumference of the reactor body.

7. The inspection apparatus for a thermo-hygrometer according to claim 1, wherein the temperature control unit comprises:
- a Peltier module which generates or absorbs heat;
- a heat radiation fin which emits some of the generated heat to outside; and
- a fan which cools the generated heat.

8. The inspection apparatus for a thermo-hygrometer according to claim 1, wherein the reactor body is made of a thermal interface material.

9. The inspection apparatus for a thermo-hygrometer according to claim 1, wherein the number of the cell holes is six.

10. A method for controlling a thermo-hygrometer using a thermo-hygrometer inspection apparatus based on phase change which includes:
- reactants of at least two kinds which are different in phase change temperature from each other;
- a plurality of cylinder type cells each of which contains the reactant of one kind out of the reactants therein;
- a reactor body having a temperature sensor hole to which a temperature sensor is inserted and a plurality of cell holes to which a plurality of cylinder type cells are respectively inserted;
- a flow pipe having a first part formed to surround an outer circumferential surface of the reactor body;
- a relative humidity chamber having a relative humidity sensor disposed therein; and
- a temperature control unit, the method for controlling the thermo-hygrometer comprising the steps of:
- controlling temperature of the reactor body by the temperature control unit;
- inducing a phase change of a first reactant which is at least one kind of the reactants;
- maintaining the reactor body at a predetermined temperature range by latent heat generated by the phase change of the first reactant;
- circulating the first gas along the inside of the flow pipe;
- making relative humidity of the first gas be in a saturated state while the first gas circulates the first part; and
- supplying the saturated first gas to the relative humidity chamber.

11. A method for inspecting a thermo-hygrometer using a thermo-hygrometer inspection apparatus based on phase change which includes:
- a first reactant of which melting point temperature is a first temperature;
- a second reactant of which melting point temperature is a second temperature;
- a plurality of cylinder type cells each of which contains the first reactant or the second reactant therein;
- a reactor body having a temperature sensor hole to which a temperature sensor is inserted and a plurality of cell holes to which a plurality of cylinder type cells are respectively inserted;
- a flow pipe having a first part formed to surround an outer circumferential surface of the reactor body;
- a relative humidity chamber having a relative humidity sensor disposed therein; and
- a temperature control unit, the method for inspecting the thermo-hygrometer comprising:
- a cooling step of controlling temperature of the reactor body to be lower than the first temperature using the temperature control unit in order to coagulate the first reactant and the second reactant;
- a first melting step of controlling temperature of the reactor body to be higher than the first temperature and to be lower than the second temperature using the temperature control unit in order to coagulate the first reactant;
- a step of maintaining the reactor body at a fourth temperature by latent heat generated by melting of the first reactant;
- a step of making the relative humidity of the first gas which circulates in the flow pipe be in a saturated state by the fourth temperature of the reactor body while the first gas circulates the first part;
- a first supplying step of supplying the saturated first gas to the relative humidity chamber;
- a first measuring step that the relative humidity sensor measures the relative humidity of the first gas supplied to the relative humidity chamber in the first supplying step;
- a first inspection step of inspecting the relative humidity sensor based on the measured relative humidity of the first gas from the first measuring step and inspecting the temperature sensor based on the phase change temperature of the first reactant;
- a second melting step of controlling temperature of the reactor body to be higher than the second temperature using the temperature control unit in order to melt the second reactant;
- a step of maintaining the reactor body at a fifth temperature by latent heat generated by melting of the second reactant;
- a step of making the relative humidity of the first gas which circulates in the flow pipe be in a saturated state by the fifth temperature of the reactor body while the first gas circulates the first part;
- a second supplying step of supplying the saturated first gas to the relative humidity chamber;
- a second measuring step that the relative humidity sensor measures the relative humidity of the first gas supplied to the relative humidity chamber in the second supplying step; and
- a second inspection step of inspecting the relative humidity sensor based on the measured relative humidity of the first gas from the second measuring step and inspecting the temperature sensor based on the phase change temperature of the second reactant, wherein the first temperature is lower than the second temperature.

12. The method for inspecting the thermo-hygrometer according to claim 11, further comprising:
- a heating step of controlling temperature of the reactor body to be higher than a preset third temperature using the temperature control unit; and
- a third inspection step of inspecting the temperature sensor based on the temperature of the reactor body, wherein the third temperature is higher than the second temperature.

13. The method for inspecting the thermo-hygrometer according to claim 11, wherein the cell holes are circumferentially spaced apart from each other around the temperature sensor hole at a predetermined interval.

14. The method for inspecting the thermo-hygrometer according to claim 13, wherein the reactant contained in the cylinder cell which is inserted into a first cell hole which is one selected from the cell holes is different in kind from the reactant contained in the cylinder cell which is inserted into a second cell hole adjacent to the first cell hole.

15. A non-transitory computer-readable storage medium in which a program of commands executable by a digital processing device is visibly realized and which is readable by the digital processing device in order to carry out a method for controlling a thermo-hygrometer using a thermo-hygrometer inspection apparatus based on phase change which includes:

reactants of at least two kinds which are different in phase change temperature from each other;

a plurality of cylinder type cells each of which contains the reactant of one kind out of the reactants therein;

a reactor body having a temperature sensor hole to which a temperature sensor is inserted and a plurality of cell holes to which a plurality of cylinder type cells are respectively inserted;

a flow pipe which has a first part formed to surround an outer circumferential surface of the reactor body;

a relative humidity chamber which has a relative humidity sensor disposed therein; and a temperature control unit, the method for controlling the thermo-hygrometer comprising the steps of:

controlling temperature of the reactor body by the temperature control unit;

inducing a phase change of the first reactant which is at least one kind of the reactants;

maintaining the reactor body at a predetermined temperature range by latent heat generated by the phase change of the first reactant;

circulating the first gas along the inside of the flow pipe;

making relative humidity of the first gas be in a saturated state while the first gas circulates in the flow pipe; and supplying the saturated first gas to the relative humidity chamber.

* * * * *